United States Patent
Emmenegger et al.

(10) Patent No.: US 6,542,263 B2
(45) Date of Patent: *Apr. 1, 2003

(54) AUTOMATIC DOCUMENT FEEDER WITH IMPROVED SHEET HANDLING CAPABILITIES AND METHOD OF FEEDING AND SCANNING OVER-SIZED MEDIA SHEETS

(75) Inventors: Stephan W. Emmenegger, San Diego, CA (US); Gregory T. Hulan, San Diego, CA (US); Heinz Waschauser, Escondido, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,602

(22) Filed: Feb. 8, 1999

(65) Prior Publication Data

US 2003/0038992 A1 Feb. 27, 2003

(51) Int. Cl.$^7$ ................................................. H04N 1/40
(52) U.S. Cl. ..................................... 358/498; 271/3.14
(58) Field of Search ................................ 358/498, 497, 358/496; 271/3.14, 4.01, 4.08, 10.09, 161

(56) References Cited

U.S. PATENT DOCUMENTS

| | | | |
|---|---|---|---|
| 4,494,166 A | 1/1985 | Billings et al. | 3/0 |
| 4,736,937 A | 4/1988 | Okuda et al. | 3/44 |
| 4,778,168 A | 10/1988 | Kashimura et al. | 271/4 |
| 4,994,861 A | 2/1991 | Brandon et al. | 15/16 |
| 5,150,273 A | 9/1992 | Le Vantine et al. | 3/0 |
| 5,400,208 A | 3/1995 | Pazda et al. | 3/2 |
| 5,636,011 A | 6/1997 | Fujiwara et al. | 15/16 |
| 5,779,234 A | 7/1998 | Tomli et al. | 5/22 |
| 6,022,012 A * | 2/2000 | Worley | 271/3.14 |

FOREIGN PATENT DOCUMENTS

| | | | | |
|---|---|---|---|---|
| GB | 2301342 A | 5/1996 | | |
| JP | 2-193856 | 7/1990 | | 29/34 |

* cited by examiner

Primary Examiner—Jerome Grant, II
Assistant Examiner—Negussie Worku

(57) ABSTRACT

An automatic document feeder (ADF) has a paper path that starts with an input tray, leads to an operational station such as a scanner, and then ends with a substantially vertical output tray. The ADF has a mechanism for picking off an individual media sheet from a stack of sheets in the input tray and propelling the sheet to the operational station where a function is performed on the sheet. Thereafter the ADF propels the sheet partially into the output tray, and momentarily stops or reverses the direction of travel of the media sheet before finally driving the entire sheet into the output tray. This ensures that if the topmost sheet in a stack in the output tray which is being lifted up by the sheet being driven into the output tray, the topmost sheet will be fall back down to a rest position in the output tray and will not spill out of the output tray. The combination ADF and scanner can be operated so that it will automatically detect whether a standard-sized sheet of media is being fed into the scanner in landscape orientation or an over-sized sheet of media is being fed into the scanner in portrait orientation. In the case of the latter, first and second portions of the over-sized sheet are successively registered over the transparent platen of the scanner and scanned. The over-sized sheet is thereafter ejected from the scanner into an output tray. The resulting digital images of the first and second portions of the over-sized sheet are rotated, stitched together by a control circuit using software and/or firmware algorithms and the complete image of the over-sized sheet is stored in a memory, faxed or printed.

20 Claims, 5 Drawing Sheets

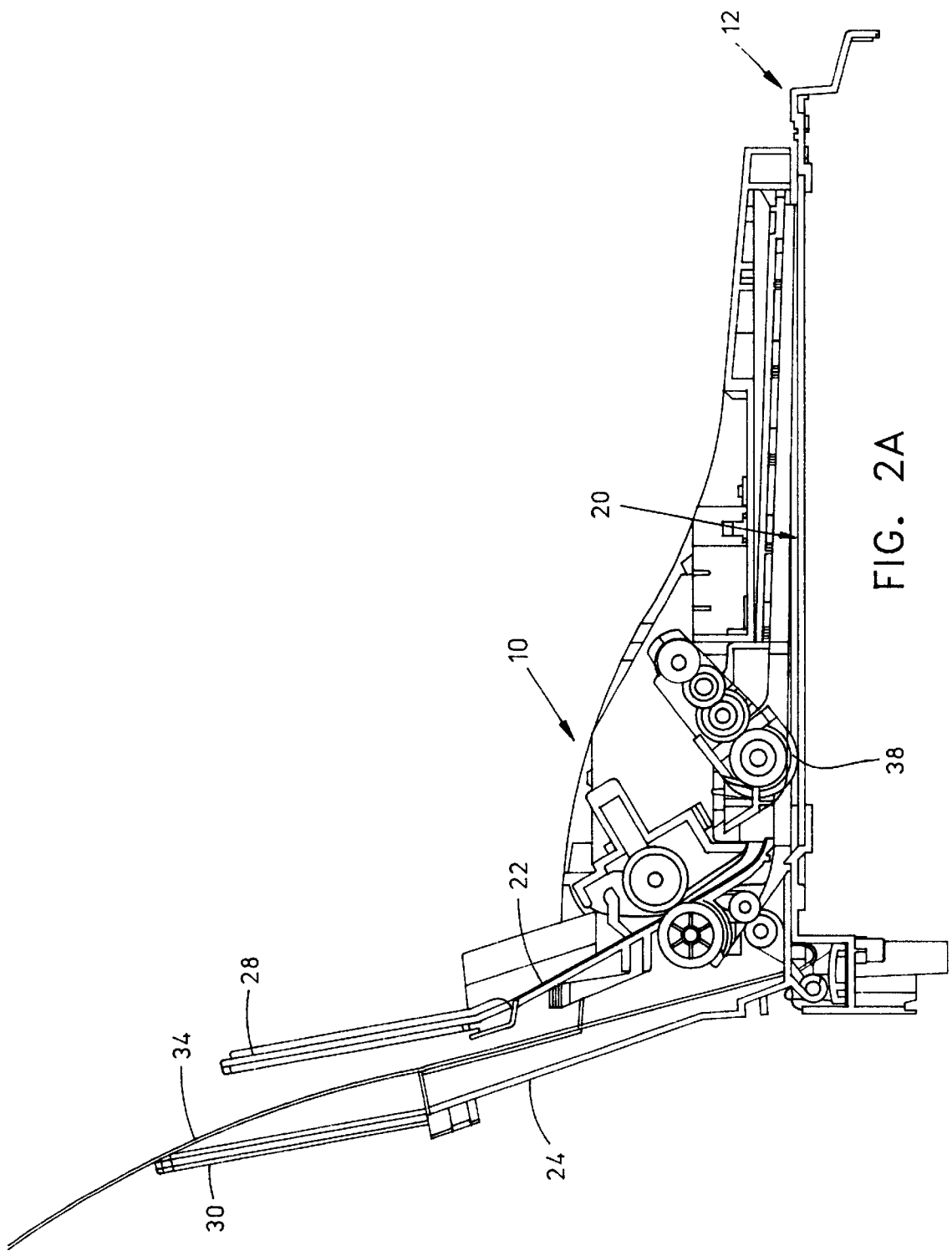

AUTOMATIC DOCUMENT FEEDER WITH IMPROVED SHEET HANDLING CAPABILITIES AND METHOD OF FEEDING AND SCANNING OVER-SIZED MEDIA SHEETS

BACKGROUND OF THE INVENTION

The present invention relates to printers, scanners and fax machines, and more particularly, to an automatic document feeder that is more versatile in terms of the size of sheets it can handle and which ensures that outputted sheets do not fall out of a partial length output tray.

Over the past several years, combination printer, scanner and fax machines have become commercially successful. They can be attached to a personal computer and function as a traditional printer for printing high quality text and/or graphics on a suitable print medium, usually paper sheets. The printing may be reliably and economically accomplished utilizing black and/or color inkjet printer cartridges. These combination machines can also scan documents fed into the same so that text and/or graphics on the documents can be digitized and inputted into the personal computer for storage and/or further manipulation. Finally, these combination machines can scan documents fed into the same so that text and/or graphics on the documents can be sent via modem and telephone systems to other parties. In some cases these combination machines can function as low volume copiers by permitting text and/or graphics on a document fed into the machine to be scanned and then to immediately thereafter be printed on a clean sheet from an input paper tray. One example of a combination printer, scanner and fax machine with the foregoing capabilities is the OfficeJet (Trademark) desktop unit manufactured and sold by HEWLETT-PACKARD COMPANY, the assignee of the present application. See for example U.S. Pat. No. 5,833,381 granted Nov. 10, 1998 and assigned to HEWLETT-PACKARD COMPANY. In this type of combination machine individual sheets are fed in a unidirectional manner from an input side of the device, through the device, to an output side of the device.

Recently flat bed scanners have become popular peripheral devices for use with personal computers. Typically a document is placed flat on a large horizontal glass or transparent plastic platen and a scanning head reciprocates beneath the transparent platen to generate a very high resolution digital image of text and/or graphics on the document for subsequent computer processing or faxing. In co-pending U.S. patent application Ser. No. 09/041,844 filed Mar. 12, 1998 of A Justine Worley, assigned to HEWLETT-PACKARD COMPANY, and entitled MODULAR AUTOMATIC DOCUMENT FEEDER FOR A FLAT BED INPUT DEVICE, now U.S. Pat. No. 6,022,012 granted Feb. 8, 2000, there is disclosed an automatic document feeder "ADF") for sequentially loading and unloading single sheets over a flat bed scanner. A main chassis carries the active components of the ADF including paper pick and drive mechanisms for delivering sheets to and from a flat bed scanner, motors and transmissions for driving the pick and drive mechanisms, a document backing assembly and an electronic controller The main chassis also includes a substantially vertical document input tray. A lower chassis of the ADF includes a low-height form factor, substantially vertical, i.e. inclined, output tray, using paper stiffness caused by a predetermined bending of the outputted sheets to cause the sheets to be self-supporting. Documents are individually fed downwardly and forwardly from the input tray, in a landscape orientation, onto the transparent platen of the scanner, which scans each document moving in a direction transverse to the paper feed direction. After the completion of the scanning operation, each document is fed rearwardly and upwardly into the inclined output tray. An ink jet or laser printer can be provided beneath the flat bed scanner, The aforementioned ADF does not utilize a scroll-type sheet feed mechanism It pushes each page instead of relying on a belt-type advance mechanism.

The aforementioned ADF is advantageously configured to be hingedly mounted to a flat bed scanner to provide a multi-function product that can scan, fax, copy and print. However, problems have arisen with regard to its sheet handling capabilities. More particularly, scanning is designed around an A/A4 scan zone in a landscape orientation only, thus preventing users from scanning and copying over-sized print media, such as legal and B-size sheets. Furthermore, if over-sized sheets are fed into the output tray in portrait fashion, one or more of the sheets can end up being pushed out of the tray onto the desktop or floor.

SUMMARY OF THE INVENTION

Accordingly, it would be desirable to provide an ADF with an improved document handling capability.

It is another object of the present invention to provide an ADF that operates in a fashion that reduces the tendency for over-sized documents to fall out of the output tray when fed into the same in portrait orientation.

It is another object of the present invention to provide a combination ADF and flat bed scanner designed to accommodate both A/A4 sized documents fed in landscape orientation and over-sized documents fed in portrait orientation.

It is still a further object of the present invention to provide a method of ejecting media sheets from an ADF in a manner that reduces the tendency for the sheets to fall out of its output tray.

Still another object of the present invention is to provide a method of scanning over-sized media sheets fed by an ADF in portrait orientation to a scanner that normally scans standard-sized media sheets fed thereto in landscape orientation.

In accordance with one aspect of the present invention, an automatic document feeder (ADF) has a paper path that starts with an input tray, leads to an operational station such as a scanner, and then ends with a substantially vertical output tray. The ADF has a mechanism for picking off an individual media sheet from a stack of sheets in the input tray and propelling the sheet to the operational station where a function is performed on the sheet. Thereafter the ADF propels the sheet partially into the output tray, and momentarily stops or reverses the direction of travel of the media sheet before finally driving the entire sheet into the output tray. This ensures that if the topmost sheet in a stack in the output tray is lifted up by the sheet being driven into the output tray, the topmost sheet will fall back down to a rest position in the output tray and will not spill out of the output tray.

According to another aspect of the present invention, the combination ADF and scanner is operated so that it can automatically detect whether a standard-sized sheet of media is being fed into the scanner in landscape orientation or an over-sized sheet of media is being fed into the scanner in portrait orientation. In the case of the latter, first and second portions of the over-sized sheet are successively registered over the transparent platen of the scanner and scanned. The over-sized sheet is thereafter ejected from the scanner into an output tray. The resulting digital images of the first and second portions of the over-sized sheet are rotated, stitched together by a control circuit using software and/or firmware algorithms and the complete image of the oversized sheet is stored in a memory, faxed or printed.

BRIEF DESCRIPTION OF THE DRAWINGS

FIGS. 2A is a vertical sectional view of the ADF of FIG. 1 mounted on top of the upper portion of a flat bed document scanner and showing a legal-sized sheet of media resting in the output tray of the ADF in portrait orientation.

DESCRIPTION OF THE PREFERRED EMBODIMENTS

Figure 1:
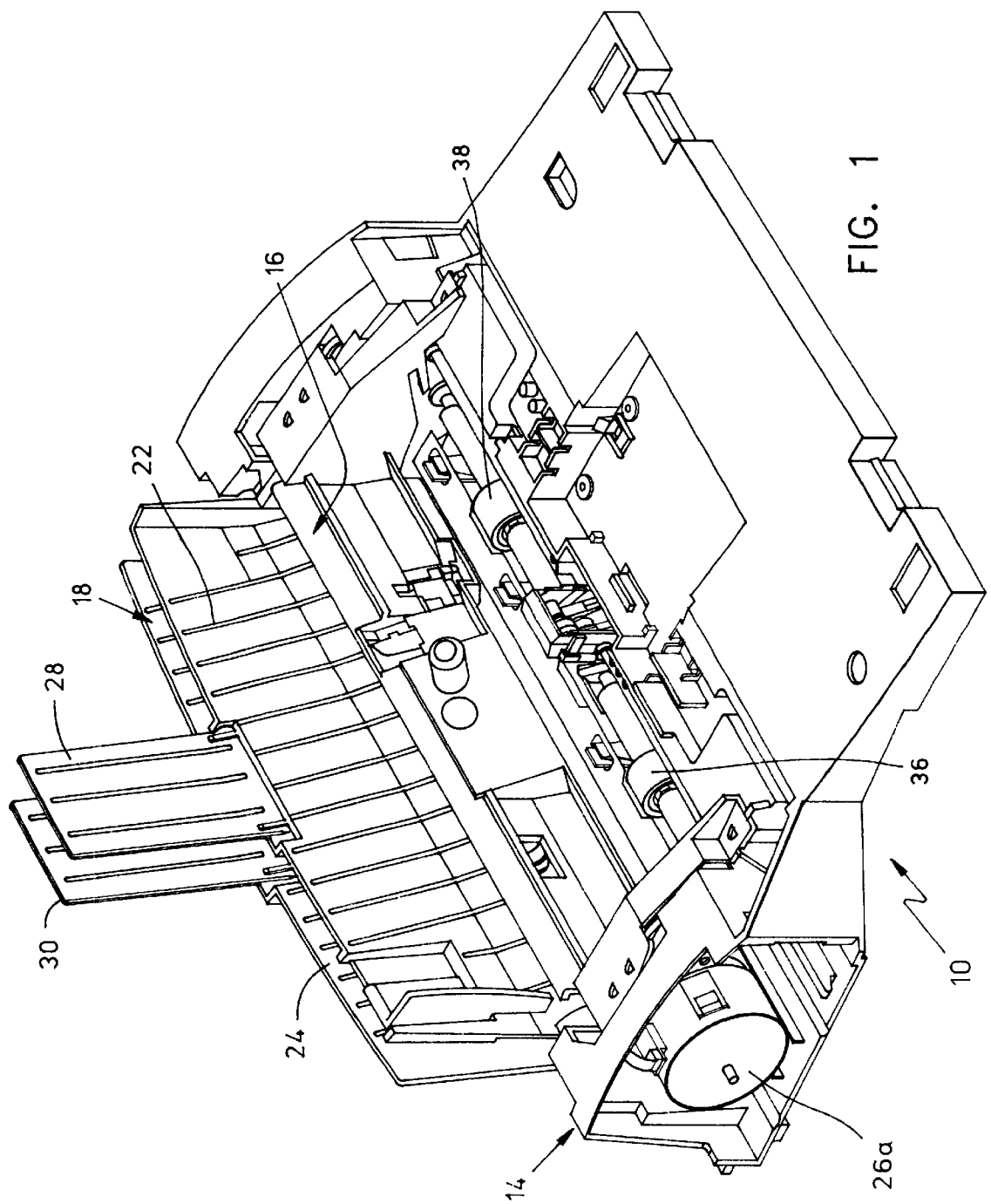
FIG. 1 is a perspective view of an automatic document feeder (ADF) utilized in accordance with the preferred embodiment of the present invention to prevent over-sized media sheets fed in portrait orientation from being accidentally driven out of the output tray of the ADF onto the desktop or floor.
Figure 2B:
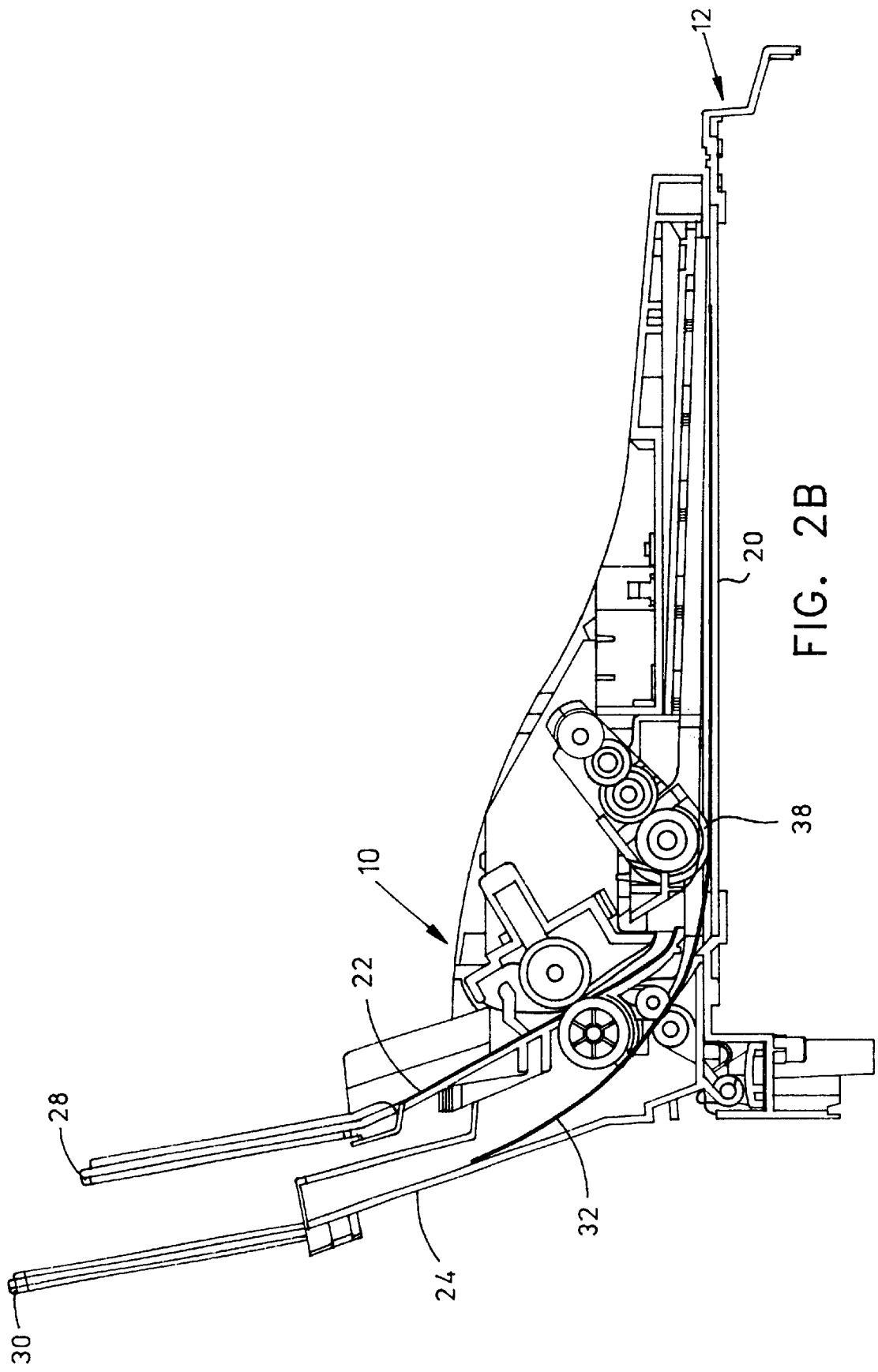
FIG. 2B is a view similar to FIG. 2A showing a legal-sized sheet of media partially ejected into the output tray of the ADF.

Referring to FIG. 1, an automatic document feeder (ADF) 10 is configured and adapted to sit on top of a flat bed scanner 12 (FIG. 2A) which is electrically connected to a personal computer (not illustrated). Except as noted hereafter, the construction and operation of the ADF 10 are similar to that disclosed in the aforementioned co-pending U.S. patent application Ser. No. 09/041,844 filed Mar. 12, 1998 of A. Justine Worley entitled MODULAR AUTOMATIC DOCUMENT FEEDER FOR A FLAT BED INPUT DEVICE, the entire disclosure of which is specifically incorporated by reference. The ADF 10 (FIG. 1) includes a main chassis 14, an upper chassis 16, and a lower chassis 18. When assembled, the three chassis 14, 16 and 18 form a sheet media path that extends forwardly from an input tray 22 to an operational station at which is located a horizontally extending clear glass or transparent plastic platen 20 (FIG. 2A) of the scanner 12. The media path then extends rearwardly from the transparent platen 20 to an output tray 24. The input tray 22 and the output tray 24 are both curved and are substantially vertically oriented, with a slight rearward inclination. The input tray 22 and the output tray 24 are generally parallel with the output tray 24 being located behind the input tray 22. The three chassis 14, 16 and 18 and the trays 22 and 24 are preferably injection molded plastic parts.

The ADF 10 normally receives standard-sized media sheets, such as eight and one-half inch by eleven inch sheets or A4-size sheets, in landscape orientation, i.e. with the longer dimension running left to right in FIG. 1, perpendicular to the feed direction. A stack of sheets is loaded into the input tray 22. The input tray 22 is concave in both vertical and horizontal planes. This double concave shape assists in both properly aligning the sheets of a multi-sheet document (not shown) and stiffening the document to facilitate sheet feeding without jamming. Sheets are individually picked off the stack in the input tray 22 and fed onto the transparent platen 20 of the flatbed scanner 12. After being scanning by a transverse motion of an optical scanning head (not illustrated) in the scanner 12, a sheet is then propelled rearwardly into the output tray 24. The sheets are normally stored in the output tray 24 until all of the sheets from the input tray 22 have been scanned and either inputted into the personal computer or sent via facsimile at which time they are manually removed from the output tray by an operator. The output tray 24 also preferably has a double concave shape. This allows a stack of sheets in the output tray 24, which extend above and beyond the tray to be self-supporting.

It will be understood that the scanner 12 is an operational station, in the broadest sense, where a function, in this case, optical scanning, is performed on a media sheet fed to the same. The ADF 10 feeds the media sheet to the operational station where a function is performed on the media sheet. It will be understood that the operational station could be a printer or some other device that acts on the media sheet. The operational function is performed on a stationary sheet in the case of a scanner and on a moving sheet in the case of a printer.

The feeding of sheets by the ADF 10 (FIG. 1) is accomplished sequentially and automatically with the aid of a pick mechanism and drive rollers described in detail in co-pending application Ser. No. 09/041,844 referenced above. A pair of stepper motors such as 26a and 26b (FIGS. 1 and 3) mounted on either side of the main chassis 14 independently drive corresponding rollers via transmissions also described in said application. The stepper motors are separately energized by a control circuit 27 (FIG. 3) in accordance with firmware and/or software implemented algorithms to move each sheet of media in the proper timed sequence from the input tray 22, over the transparent platen 20 of the scanner 12 and then back into the output tray 24. The aforementioned combination of the ADF 10 and the flat bed scanner 12 has the advantage of allowing multiple scans of an original document which eliminates the need for the entire document to be scanned into memory with a single pass of the optical scanning head.

As best seen in FIG. 1, the ADF 10 is also equipped with an input tray extender 28 and an output tray extender 30, which are connected to, and project vertically from, the uppermost edges of the input tray 22 and output tray 24, respectively. These extenders 28 and 30 facilitate the handling of over-sized media sheets in portrait orientation, i.e. with their long dimension aligned with the longitudinal direction of the media feeding.

Figure 2C:
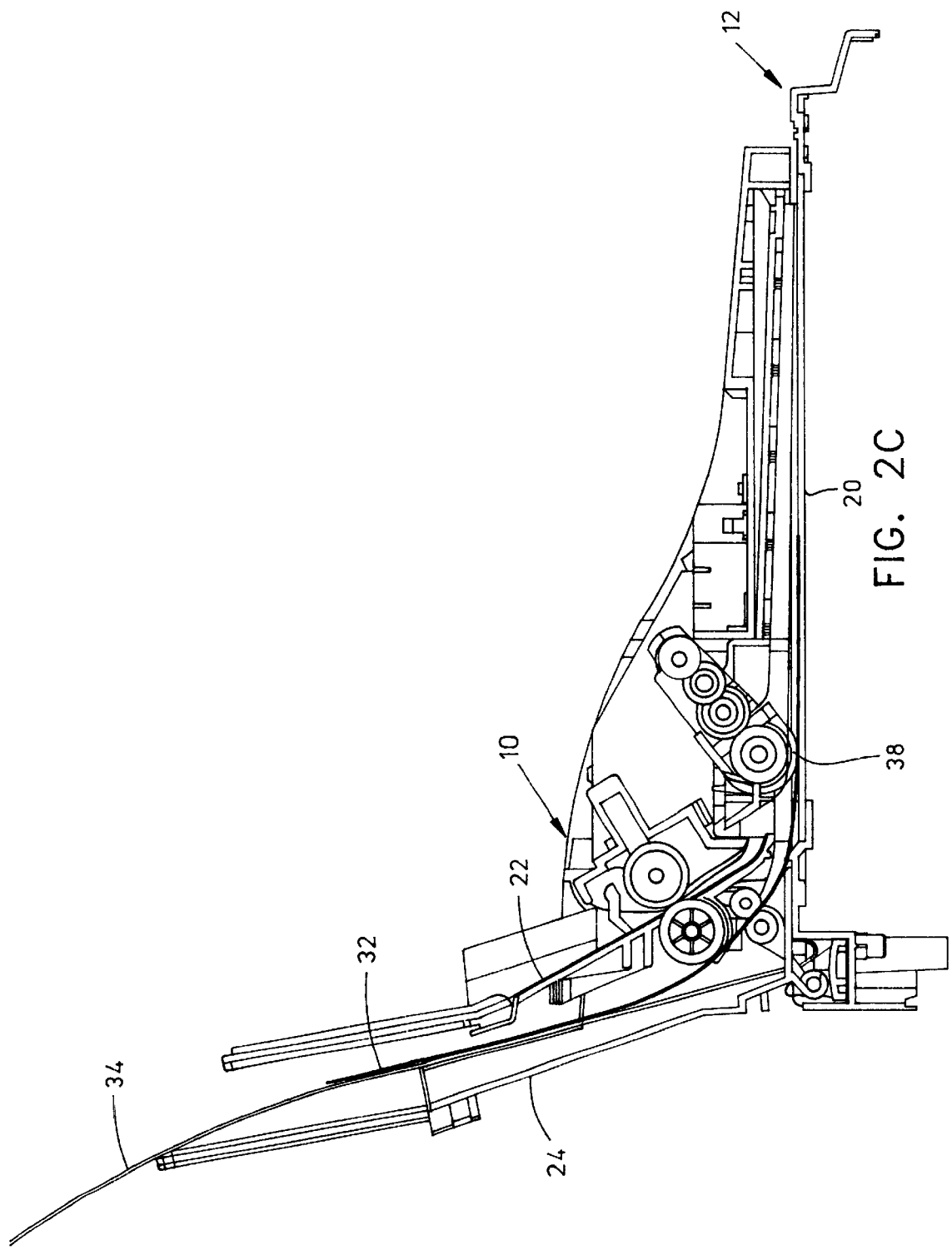
FIG. 2C is a view similar to FIGS. 2A and 2B showing a legal-sized sheet of media partially ejected into the output tray of the ADF with its leading edge pushing up against a legal-sized sheet of media already resting in the output tray.

When a sheet 32 (FIG. 2B) of media is ejected from a scanning position on top of the transparent platen 20 its leading portion, which used to be its trailing portion, has to bend in a curved fashion in order to conform to the radius of curvature of the output path. This causes its leading edge, which used to be its trailing edge, and its leading portion to press against those portions of the ADF 10 defining the output path, if this is the first sheet ejected, or against the previously ejected sheet of media. As the leading edge moves higher and higher up the output path there is more and more surface contact with the previously ejected sheet. Friction between the sheets builds up, especially if the output tray 24 already contains a stack of ejected sheets having more than an insubstantial thickness so that the output path has been significantly narrowed. In addition, in some office environments, particularly those characterized by very low humidity, a substantial charge of static electricity will build up between the sheet being ejected and the immediately previously ejected sheet of media. This appears to be at least partially a result of the media sheets rubbing against glass and plastic. When friction, enhanced by electro-static adhesion between the two overlapping sheets, exceeds the weight of a sheet, then the sheet 34 (FIG. 2C) immediately behind the sheet 32 being ejected will sometimes lift up. Since the output tray extender 30 only extends about three-quarters of the height (length) of an over-sized sheet of paper fed in portrait orientation, the sheet 34 can be pushed completely out of the output tray 24 and onto the desktop or floor. Sheets that are driven completely out of the output tray 24 can literally float away and come to rest underneath a piece of equipment on the desktop, or even onto the floor and underneath furniture. This type of unintended ejection is very undesirable since the operator may not observe this accident and will end up retrieving an incomplete multi-page document from the output tray 24 without knowing that it is incomplete. Even if the operator does observe the accident, it is tedious to retrieve the sheet that has been improperly ejected and insert it back into the multi-page document at the correct location and in the correct orientation.

In order to prevent this type of sheet media "overflow" we have discovered that the eject motion can be interrupted in a fashion that unsticks the adjacent sheets, and allows partially lifted sheets in the output tray 24 to fall back down to their proper positions. In order to achieve this, the main drive rollers 36 and 38 (FIG. 1) are driven by the stepper motors 26a and 26b so that the media sheet 32 being ejected is only partially ejected from above the transparent platen 20 and into the output path, such as seventy percent, for example. The main drive rollers 36 and 38 are then driven in a reverse direction to retract the media sheet 32 a minute amount, for example one-quarter of an inch. Thereafter the main drive rollers 36 and 38 are once again reversed to drive the media sheet 32 all of the way into the output tray 24. This technique prevents over-sized sheets that are fed through the ADF 10 in portrait fashion from spilling out of the output tray 24 over the top end of the output tray extender 30. Clearly the speed, timing and extent of each media motion driving segment can be varied while still producing the same beneficial result. In general, the "subsequent" media sheet 32 is preferably fed between about one-half and three-quarters of its way into the output tray 24 before its feeding direction is momentarily reversed. The subsequent media sheet 32 is preferably momentarily propelled back out of the tray in rapid fashion so that less than about one-tenth of the subsequent media sheet 32 is withdrawn from the output tray 24. This ensures that the "previous" media sheet 34, if it has been partially lifted, will fall back down to its rest position using the force of gravity and its inertia. When the previous media sheet 34 is in its rest position its lowermost edge is engaged with the lower end surface of the output tray 24.

The ADF 10 can feed standard-sized print media, e.g. standard letter or A4 sheets, in landscape fashion to the scanner 12 which is designed around an A/A4 scan zone. The scanning is done by moving the optical scan head laterally, i.e. transverse to the direction of travel of the sheets. The extenders 28 and 30 permit over-sized media sheets such as legal-size and B-size documents to be fed to the scanner 12 in portrait orientation. In such a case the media orientation is perpendicular to the scan zone and scan axis. By adding an additional sensor to the combination ADF 10 and scanner 12 and providing additional software/firmware, over-sized media sheets can be scanned in portrait orientation even though the scanner 12 normally only accommodates standard-sized media sheets fed in landscape orientation.

Figure 3:
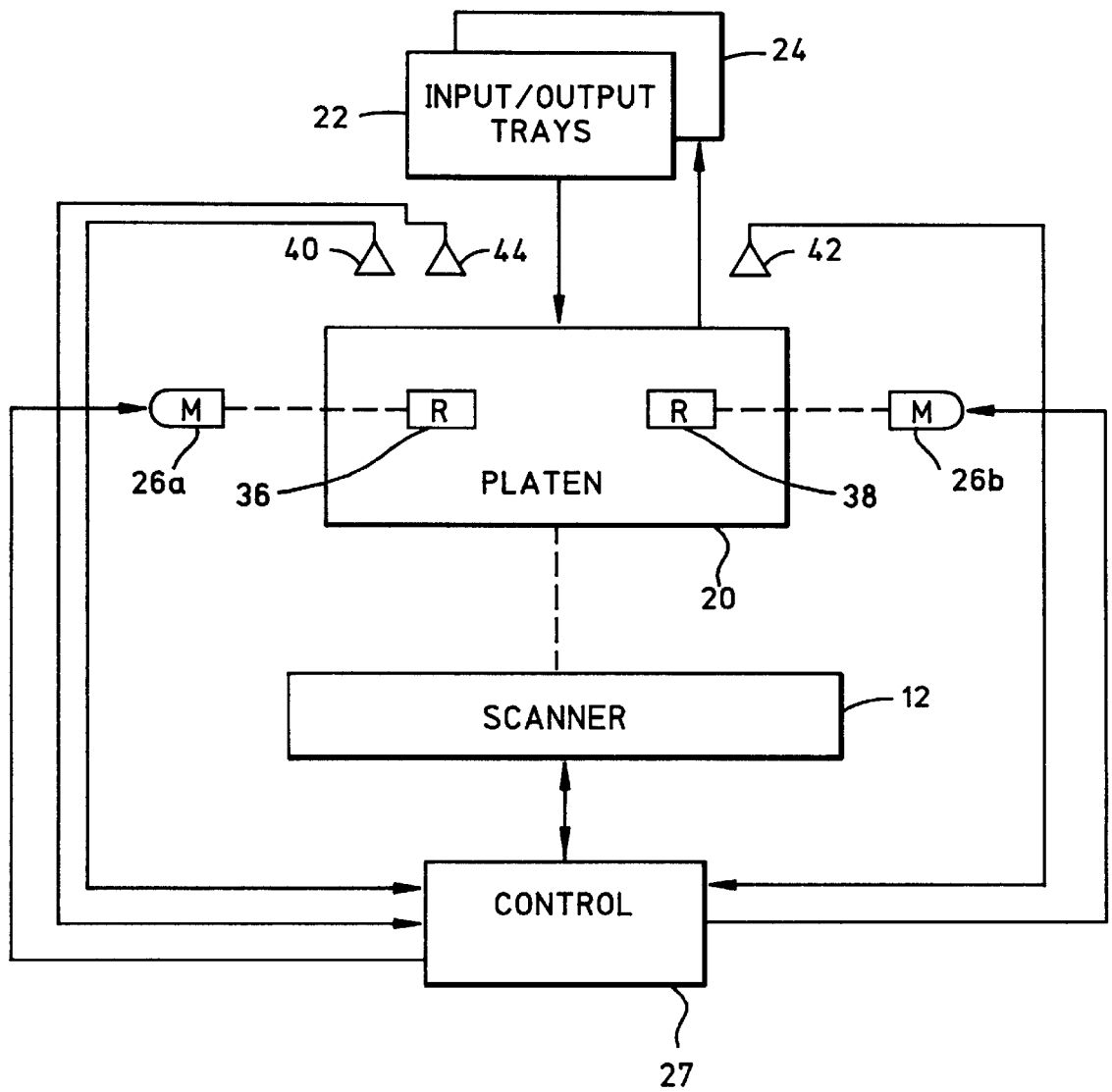
FIG. 3 is a functional block diagram of a combination ADF and document scanner utilized in accordance with another aspect of the present invention to permit over-sized media sheets to be fed and scanned in portrait orientation.

FIG. 3 is a functional block diagram of a combination ADF 10 and document scanner 12 that permits over-sized media sheets to be fed and scanned in portrait orientation. A pair of sensors 40 and 42 in the ADF 10 normally sense the top and bottom edges of standard-sized media sheet fed by the ADF 10 to the scanner 12 in landscape orientation. The control circuit 27, which is connected to the sensors 40 and 42, can independently operate the stepper motors 26a and 26b so that if necessary the media sheet can be de-skewed by the drive rollers 36 and 38. Where an over-sized sheet of media is picked off by the ADF 10 from the input tray 22 and fed in portrait orientation a third portrait sensor 44 is interrogated by the control circuit 27. When the control circuit 27 determines that there is no sheet outside at least one portrait margin, the firmware or software feed algorithms utilized by the control circuit 27 are switched to a portrait mode. The sheet media is then fed to the drive rollers 36 and 38 where it is de-skewed. Next a first portion of the sheet media is fed onto the transparent platen 20 of the scanner 12 for a predetermined duration to position the sheet to a system reference edge.

The control circuit 27 next causes the optical scanner head to reciprocate in a left-to-right direction in FIG. 3, transverse to the direction of travel of the sheet media. The first portion of the sheet media is thus scanned and a digital image of its text and/or graphics is generated, rotated and stored in a memory part of the control circuit 27. The sheet media is then advances so that a second portion thereof is located on the transparent platen 20 and scanned, and its digital image rotated and stored in the memory. In order to permit the scanning of the second portion of the media sheet, the first portion must be advanced out of the scan zone. This can be mechanically facilitated by providing a ramp in the forward portion of a scanner housing (not illustrated) similar in configuration to a rear escape ramp. During this process, the leading portion of the over-sized sheet extends through a bezel (not illustrated) in a forward side of the scanner housing. Ribs (not illustrated) can be provided in the main chassis 14 to prevent the advancing media sheet from snagging on the plastic parts. The output of one of the sensors 40, 42 or 44 is then used to detect the trailing edge of the media sheet. The control circuit 27 uses this information in order to stop the advancement of the media sheet at a predetermined time so that the second remaining portion will be registered on the transparent platen 20 to allow the text and/or graphics on the second portion to be scanned.

The two stored images are stitched together by the control circuit 27 using stored software and/or firmware algorithms. The resulting complete image is then stored in the personal computer, printed or faxed. The media sheet is then partially ejected rearwardly from the scanner 12 into the output tray 24, momentarily reversed, and then fully ejected into the output tray 24 to prevent a previously ejected sheet from being pushed up out of the tray 24 over the extender 30.

Whereas we have described preferred embodiments of our combination ADF and scanner and improved methods of operating the same to prevent overspill and allow the scanning of over-sized media sheet in portrait orientation, it will be apparent to those of ordinary skill in the art that our invention may be modified in both arrangement and detail. For example, when ejecting a sheet of media into the output tray, it may be difficult and/or complex to momentarily reverse the direction of travel of the sheet. Beneficial results can also be achieved if the ejection motion is momentarily stopped to allow a previous sheet that is being lifted to fall backdown into the output tray under the force of gravity. It will of course be understood that where the media sheet is partially ejected into the output tray and then its direction of travel is reversed, it will momentarily stop before moving in the reverse direction. Momentary reversal during ejection is thus a species of the invention which involves momentary stopping during ejection. Therefore, the protection afforded our invention should only be limited in accordance with the scope of the following claims.

We claim:

1. A method of feeding a media sheet through an automatic document feeder having a feed path starting from an input tray and leading to an operational station and ending at an inclined output tray normally holding a stack of media sheets previously fed through the automatic document feeder, comprising the steps of:
   picking a subsequent sheet of media from the input tray and propelling the sheet to the operational station;
   performing a function on the subsequent media sheet at the operational station;
   propelling the subsequent media sheet in a first direction from the operational station until a portion of the sheet enters the output tray and engages a previous media sheet in a rest position in the output tray and begins to drive the previous media sheet upwardly out of the output tray;
   momentarily stopping the subsequent media sheet to allow the previous media sheet to fall back down to the rest position; and
   propelling the subsequent media sheet in the first direction to completely feed the subsequent media sheet into the output tray.

2. The method of claim 1 wherein after the motion of the subsequent media sheet has been momentarily stopped, momentarily propelling the subsequent media sheet in a second direction opposite the first direction, before once again propelling the subsequent media sheet in the first direction to completely feed the subsequent media sheet into the output tray.

3. The method of claim 1 wherein the subsequent media sheet is fed between about one-half and three-quarters of its way into the output tray before its feeding direction is momentarily stopped.

4. The method of claim 2 wherein the subsequent media sheet is momentarily propelled in the second direction so that less than about one-tenth of the subsequent media sheet is withdrawn from the output tray.

5. The method of claim 2 wherein the subsequent media sheet is fed between about one-half and three-quarters of its way into the output tray before its feeding direction is momentarily reversed and further wherein the subsequent media sheet is momentarily propelled in the second direction so that less than about one-tenth of the subsequent media sheet is withdrawn from the output tray.

6. The method of claim 1 wherein the feed path leads in a forward direction from the input tray to the operational station and then in a rearward direction to the output tray.

7. The method of claim 1 wherein the operational station is an optical scanner and the subsequent sheet is momentarily stopped in the scanner to permit text and/or graphics on the subsequent sheet to be optically scanned.

8. The method of claim 1 wherein the input and output trays are substantially vertically inclined and parallel.

9. The method of claim 1 wherein the output tray extends only a portion of a height of the media sheet fed into the output tray.

10. The method of claim 1 wherein the media sheets are propelled by drive rollers rotated by at least one stepper motor.

11. A method of automatically scanning standard-sized sheets of media fed from an automatic document feeder in landscape orientation and over-sized sheets of media fed from the automatic document feeder in portrait orientation utilizing a scanner adapted to scan standard-sized documents in landscape fashion by moving an optical scanning head in a direction transverse to a direction of travel of sheet media fed into the scanner by the automatic document feeder, comprising the steps of:
   picking a sheet of media from an input tray and propelling the sheet in a forward direction;
   determining whether the sheet is a standard-sized sheet in a landscape orientation or an over-sized sheet in a portrait orientation;
   if the sheet is determined to be a standard-sized sheet, fully advancing the standard-sized sheet into the scanner and scanning the entire standard-sized sheet in a single pass of an optical scanning head, generating a first digital image of the text and/or graphics on the standard-sized media sheet and storing the first digital image in a memory;
   alternately, if the sheet is determined to be an over-sized sheet, advancing a first portion of the over-sized sheet into the scanner, scanning the first portion of the over-sized sheet in a single pass of the optical scanning head, generating a second digital image of the text and/or graphics on the first portion of the oversized media sheet and storing the second digital image in the memory, and thereafter, advancing a second remaining portion of the over-sized sheet into the scanner, scanning the second portion of the over-sized sheet in a single pass of the optical scanning head, generating a third digital image of the text and/or graphics on the second portion of the oversized media sheet and storing the third digital image in the memory;
   rotating and stitching the second and third digital images together to generate a fourth digital image representing the entire text and/or graphics on the over-sized media sheet and storing the fourth image in the memory;
   propelling whichever sheet of media has been scanned out of the scanner and into an output tray of the automatic document feeder.

12. The method according to claim 11 wherein the output tray is substantially vertical and the media sheet is partially propelled into the output tray, and then momentarily stopped, and then fully propelled into the output tray in order to prevent a previously ejected media sheet in the output tray from being pushed up out of the output tray by the sheet being ejected from the scanner.

13. The method according to claim 12 wherein the over-sized media sheet is fed between about one-half and three-quarters of its way into the output tray before its feeding direction is momentarily stopped.

14. The method of claim 13 wherein the over-sized media sheet is momentarily reversed after it has been momentarily stopped so that less than about one-tenth of the over-sized media sheet is withdrawn from the output tray.

15. The method of claim 11 wherein the sheet of media is de-skewed before being fed into the scanner.

16. The method of claim 11 wherein the step of determining whether the sheet is a standard-sized sheet in a landscape orientation or an over-sized sheet in a portrait orientation is performed by sensing whether a sheet picked out of the input tray of the automatic document feeder extends outside a portrait margin.

17. The method of claim 11 wherein the output of a sensor in a media path is used to detect the trailing edge of the media sheet in order to register the second remaining portion of the media sheet on a transparent platen of the scanner in the appropriate position to allow the text and/or graphics on the second portion to be scanned.

18. The method of claim 11 wherein the side edges of the media sheet are sensed by a pair of sensors in the paper path of the automatic document feeder and the sheet is de-skewed before being fed into the scanner.

19. The method of claim 11 wherein the sheets are propelled along a feed path that leads in a forward direction from the input tray to the scanner and then in a rearward direction to the output tray.

20. A combination document feeder and scanner comprising:

an automatic document feeder having at least one chassis defining a paper path that starts with an input tray, leads to an operational station, and then ends with a substantially vertical output tray, and mechanisms for picking off an individual media sheet from a stack of sheets in the input tray and propelling the sheet to the operational station where a function is performed on the sheet;

an optical scanner including a transparent platen located at the operational station of the automatic document feeder; and a control circuit for causing the automatic document feeder to propel the sheet partially into the output tray, and then momentarily stop the travel of the media sheet before finally driving the entire sheet into the output tray in order to ensure that a topmost sheet in a stack previously ejected into the output tray which is lifted up by a subsequent sheet being driven into the output tray will be fall back down to a rest position in the output tray and will not spill out of the output tray.

* * * * *